(12) United States Patent
Pasolini et al.

(10) Patent No.: US 7,698,097 B2
(45) Date of Patent: Apr. 13, 2010

(54) METHOD FOR CONTROLLING A PEDOMETER BASED ON THE USE OF INERTIAL SENSORS AND PEDOMETER IMPLEMENTING THE METHOD

(75) Inventors: Fabio Pasolini, S. Martino Siccomario (IT); Ivo Binda, Voghera (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 707 days.

(21) Appl. No.: 11/537,986

(22) Filed: Oct. 2, 2006

(65) Prior Publication Data

US 2007/0143069 A1 Jun. 21, 2007

(30) Foreign Application Priority Data

Oct. 3, 2005 (EP) .................. 05425684

(51) Int. Cl.
*G01C 22/00* (2006.01)
*G06F 17/40* (2006.01)
(52) U.S. Cl. .................. 702/160; 702/176; 702/178; 377/24.2
(58) Field of Classification Search .......... 702/160, 702/176, 178
See application file for complete search history.

(56) References Cited

U.S. PATENT DOCUMENTS 6,175,608 B1 * 1/2001 Pyles et al. ............. 377/24.2

6,898,550 B1   5/2005 Blackadar et al. .......... 702/182
7,169,084 B2 * 1/2007 Tsuji ........................ 482/8
7,297,088 B2 * 11/2007 Tsuji ........................ 482/3
2001/0031031 A1 * 10/2001 Ogawa et al. ............ 377/24.2

FOREIGN PATENT DOCUMENTS

| GB | 2 359 890 | 9/2001 |
| JP | 63-262784 | 10/1988 |
| JP | 04-192095 | 7/1992 |

OTHER PUBLICATIONS

Tasaka, Translation of JP 63262784, published Oct. 31, 1988.*
Tasaka, Translation of H04-192095, published Jul. 10, 1992.*

* cited by examiner

*Primary Examiner*—Hal D Wachsman
(74) *Attorney, Agent, or Firm*—Lisa K. Jorgenson; Robert Iannucci; Seed IP Law Group PLLC

(57) ABSTRACT

A method for controlling a pedometer includes the steps of: generating a signal correlated to movements of a user of the pedometer; and detecting steps of the user on the basis of the signal. The method moreover envisages the steps of checking whether sequences of detected steps satisfy pre-determined conditions of regularity; updating a total number of valid steps if the conditions of regularity are satisfied; and preventing the updating of the total number of valid steps if the conditions of regularity are not satisfied.

26 Claims, 3 Drawing Sheets

METHOD FOR CONTROLLING A PEDOMETER BASED ON THE USE OF INERTIAL SENSORS AND PEDOMETER IMPLEMENTING THE METHOD

BACKGROUND OF THE INVENTION

1. Field of the Invention

The present invention relates to controlling a pedometer based on the use of inertial sensors.

2. Description of the Related Art

As is known, a pedometer is a device that can be carried by a user and has the function of counting the number of steps during various walking or running activities for estimating accordingly the distance traveled. The indications supplied are useful for quantifying the motor activity performed by a person in the course of a given period, for instance, for clinical purposes, for assessing the athletic performance, or even just for simple personal interest.

The reliability of a pedometer obviously depends on the precision in estimating the step length of the user at the various rates of locomotion, but also on the selectivity in recognizing and ignoring events not correlated to the gait, which, however, cause perturbations resembling those produced by a step. For example, many pedometers are based on the use of inertial sensors, which detect accelerations along a substantially vertical axis, and recognize that a step has been being made by a user when the time plot of the acceleration signal shows given morphological characteristics. Basically, a step is recognized when the pedometer detects a positive acceleration peak (i.e., a peak directed upwards) having an amplitude greater than a first threshold, followed, at a distance of some tenths of second, by a negative acceleration peak (directed downwards) having an amplitude greater than a second threshold. However, there are many random events that can interfere with correct recognition of the step. Impact or other external vibrations and given movements of the user can, in fact, give rise to so-called "false positives", i.e., to events that are recognized as steps even though in actual fact they are not, because the morphological characteristics produced are compatible. Events of this type are very frequent also in periods of rest, when the user, albeit not walking, in any case performs movements that can be detected by the pedometer. In the majority of cases, also "isolated" steps or very brief sequences of steps are far from significant and should preferably be ignored because they are, in effect, irrelevant in regard to assessment of the motor activity for which the pedometer is being used.

Of course, in all these situations, the count of the steps may prove to be completely erroneous.

BRIEF SUMMARY OF THE INVENTION

One embodiment of the present invention is a method for controlling a pedometer and a pedometer which overcome the described above limitations.

One embodiment is a method for controlling a pedometer. The method includes: generating a signal correlated to movements of a user of the pedometer; detecting steps of the user based on the signal; checking whether sequences of the detected steps satisfy pre-determined conditions of regularity; updating a total number of valid steps if the conditions of regularity are satisfied; and preventing updating of the total number of valid steps if the conditions of regularity are not satisfied.

BRIEF DESCRIPTION OF THE SEVERAL VIEWS OF THE DRAWINGS

For a better understanding of the invention, an embodiment thereof is now described, purely by way of non-limiting example and with reference to the attached plate of drawings, wherein.

DETAILED DESCRIPTION OF THE INVENTION

Figure 1:
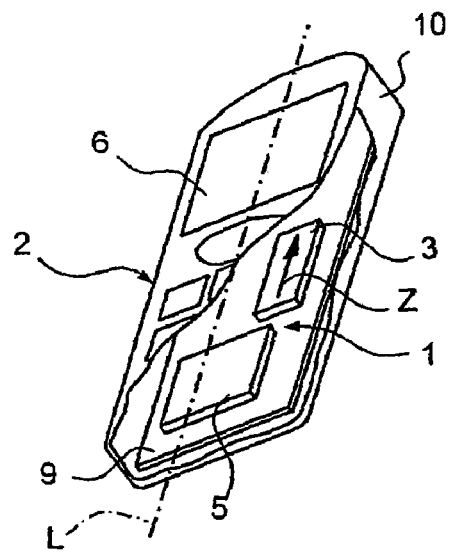
FIG. 1 shows a simplified and partially sectioned perspective view of a portable electronic device incorporating a pedometer according to the present invention.
Figure 2:
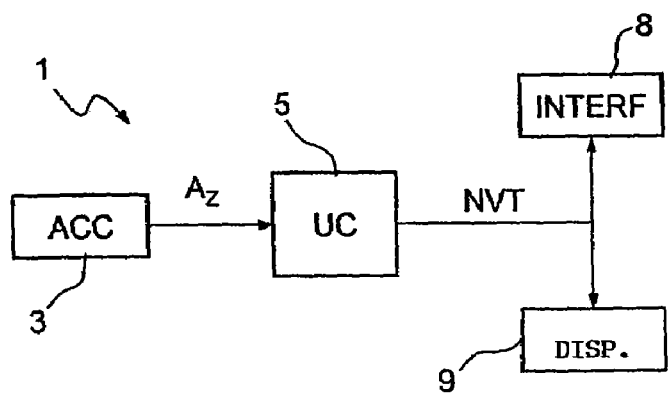
FIG. 2 is a simplified block diagram of the pedometer of FIG. 1.

With reference to FIGS. 1 and 2, a pedometer 1 is integrated within a portable electronic device, such as a cell phone 2. The pedometer 1 comprises an inertial sensor 3, a control unit 5, equipped with a nonvolatile-memory module (not illustrated herein), a display 6, and a communication interface 8, all housed on a card 9, which is, in turn, fixed within a casing 10 of the cell phone 2. In the embodiment described herein, the control unit 5 performs control functions of the pedometer 1 and, moreover, presides over bi-directional communication and over handling of the functions envisaged for the cell phone 2. Likewise, the display 6, which is obviously arranged so as to be visible from the outside of the casing 10, can be used for displaying both information regarding the pedometer 1 and, more in general, information regarding the operation of the cell phone 2.

The inertial sensor 3 is a linear accelerometer of a MEMS (micro-electromechanical systems) type and is mounted on the card 9 so as to have a detection axis Z substantially parallel to a longitudinal axis L of the casing 10 of the cell phone 2. In practice, the detection axis Z and the longitudinal axis L are substantially horizontal, when the cell phone 2 is resting on a surface, and substantially vertical or slightly inclined with respect to the vertical when the cell phone 2 is handled. The inertial sensor 3 supplies at output an acceleration signal $A_Z$, which is correlated to the accelerations undergone by the inertial sensor 3 itself along the detection axis Z.

The control unit 5 receives and processes the acceleration signal $A_Z$ as explained in detail hereinafter for identifying and counting a total number of valid steps $N_{VT}$ made by a user wearing or carrying the pedometer 1, for example, on his belt or on his shoulder. In addition, the control unit 5 is preferably configured for generating an estimate of the distance traveled by the user and other data, such as, for example, estimates of the average speed during movement and energy consumption.

The total number of valid steps $N_{VT}$ and the other data possibly produced are sent to the display 6.

The communication interface 8 in this case is based on the transceiver system (known and not shown) of the cell phone 2 and, preferably, also comprises a port (also known and not shown) for communication with a computer. The communication interface 8 can thus be used both for downloading the data produced by the pedometer 1 (amongst which at least the total number of valid steps $N_{VT}$) and for uploading operating parameters for the pedometer 1 into the control unit 5.

The control unit 5 is configured for executing a control procedure, as illustrated with reference to FIGS. 3-8.

Upon switching-on of the pedometer 1, an initialization step is executed (block 100, FIG. 3), in which a first counter of the total number of valid steps $N_{VT}$; a second counter, hereinafter referred to as number of valid control steps $N_{VC}$; and a third counter, hereinafter referred to as number of invalid steps $N_{INV}$, are set to zero.

The control unit 5 then executes a first counting procedure (block 110), based upon the sampling of the acceleration signal $A_Z$ at a pre-determined frequency, for example 25 Hz. In this step, the user is considered at rest and the control unit 5 is considered as waiting to recognize, on the basis of the acceleration signal $A_Z$, sequences of events corresponding to a sequence of steps that are close to one another, which satisfy pre-determined conditions of regularity described in detail hereinafter. When a sequence of steps corresponding to a regular gait of the user is recognized, the first counting procedure is interrupted. Alternatively, the first counting procedure terminates when a time interval $T_C$ that has elapsed from the last step recognized is longer than a first time threshold $T_{S1}$, for example 10 s. On exit from the first calculation procedure, the control unit 5 sets a state flag $F_{ST}$ to a first value C, if a sequence of steps that satisfies the conditions of regularity has been recognized, and to a second value PD, if the first time threshold $T_{S1}$ has been exceeded.

At the end of the first counting procedure, the control unit 5 checks whether the state flag $F_{ST}$ has been set at the first value C (block 120), i.e., whether a sequence of steps has been recognized. If so (output YES from block 120), a second counting procedure is executed (block 130). The user is considered to be moving, and a first counter, hereinafter referred to as total number of valid steps $N_{VT}$, is incremented whenever an event corresponding to a step is recognized. Furthermore, the control unit 5 checks the regularity of the sequences of steps, as explained hereinafter, and, when an interruption in the locomotion is detected, the second counting procedure is terminated, and execution of the first counting procedure resumes (block 110).

If, instead, the state flag $F_{ST}$ has the second value PD, the pedometer 1 is set in a low-consumption wait state ("power down" state), and the control unit 5 executes a surveying procedure (block 140). The surveying procedure terminates when a variation of the d.c. component of the acceleration signal $A_Z$ is detected, i.e., when the cell phone 2 that includes the pedometer 1 is moved. The control unit 5 then returns to execution of the first calculation procedure (block 110).

Figure 4:
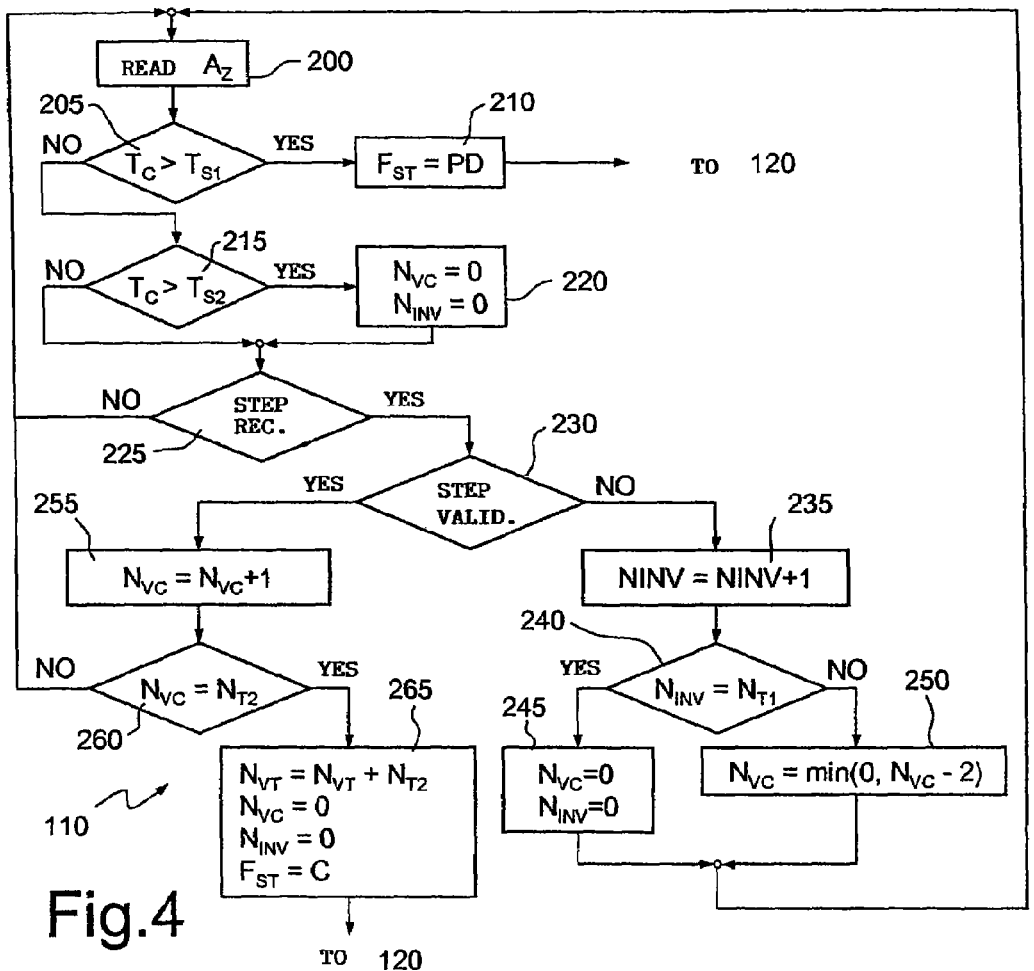
FIG. 4 is a more detailed flowchart corresponding to a first step of the method of FIG. 3.

The first counting procedure is illustrated in greater detail in FIG. 4.

Initially, the control unit 5 reads a sample of the acceleration signal $A_Z$ (block 200) and then evaluates whether the time interval $T_C$ that has elapsed from the last step recognized is higher than the first time threshold $T_{S1}$, i.e., whether the step recognition fails for a period longer than the first time threshold $T_{S1}$ (block 205). If so (output YES from block 205), the state flag $F_{ST}$ is set at the second value PD (block 210) and the first counting procedure is terminated (in this eventuality, after the test on the state flag $F_{ST}$ of block 120 of FIG. 3, the surveying procedure is executed, block 140). Otherwise (output NO from block 205), the duration of the time interval $T_C$ is compared with a second time threshold $T_{S2}$, shorter than the first time threshold $T_{S1}$ and equal, for example, to 3 s (block 215). If the second time threshold $T_{S2}$ has been exceeded (output YES from block 215), the number of valid control steps $N_{VC}$ and the number of invalid steps $N_{INV}$ are set to zero (block 220); then a step-recognition test is carried out (block 225). Otherwise (output NO from block 215), the control unit 5 directly executes the step-recognition test.

In the step-recognition test of block 225, the control unit 5 verifies whether the time plot of the acceleration signal $A_Z$ (i.e., the sequence of the samples acquired) has pre-determined characteristics. In particular (FIG. 5), a step is recognized if the acceleration signal $A_Z$ shows a positive peak, higher than a positive acceleration threshold $A_{ZP}$, followed by a negative peak, smaller than a negative acceleration threshold $A_{ZN}$, and if the negative peak falls within a time window TW of pre-determined amplitude and, moreover, located at a pre-determined distance after the positive peak.

Figure 6:
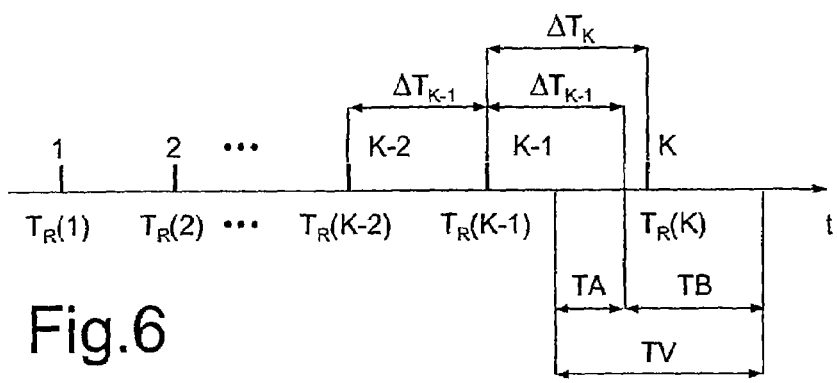
FIG. 6 is a graph that represents second quantities used in the method according to the present invention.

If the control unit 5 does not recognize an event corresponding to a step (output NO from block 225), a new sample of the acceleration signal $A_Z$ is read (block 200). If, instead, the step-recognition test is passed (output YES from block 225), the control unit 5 executes a first validation test, corresponding to the regularity of the individual step (block 230). With reference also to FIG. 6, the validation occurs when the duration $\Delta T_K$ of a current step K is substantially homogeneous with respect to the duration $\Delta T_{K-1}$ of an immediately preceding step K−1 (the duration of a generic step is determined by the time that has elapsed between an instant of recognition of the step of which the duration is evaluated and an instant of recognition of the step that immediately precedes it). More precisely, the last step recognized is validated if the instant of recognition of the current step $T_R(K)$ falls within a validation interval TV, defined with respect to the instant of recognition of the immediately preceding step $T_R(K-1)$, in the following way:

$$TV=[T_R(K-1)+\Delta T_{K-1}-TA,\ T_R(K-1)+\Delta T_{K-1}+TB]$$

where TA and TB are complementary portions of the validation interval TV. In the embodiment of the invention described herein, the complementary portions TA, TB are defined as follows, for the generic current step K:

$$TA=\Delta T_{K-1}/2$$

$$TB=\Delta T_{K-1}$$

Consequently, the validation interval is asymmetrical with respect to the instant $T_R(K-1)+\Delta T_{K-1}$ and has an amplitude equal to $3\Delta T_{K-1}/2$. The validation interval TV could, however, be symmetrical and have a different amplitude. In practice, it is verified that the last step recognized is compatible with the frequency of the last steps made previously.

If the verification yields a negative result (output NO from block 230), the number of invalid steps $N_{INV}$ is incremented by one (block 235) before being compared with a first programmable threshold number $N_{T1}$, for example 3 (block 240). If the number of invalid steps $N_{INV}$ has reached the first threshold number $N_{T1}$ (output YES from block 240), both the number of invalid steps $N_{INV}$ and the number of valid control steps $N_{VC}$ are set to zero (block 245), and the first counting procedure is resumed, with reading of a new sample of the acceleration signal $A_Z$ (block 200). If, instead, the number of invalid steps $N_{INV}$ is smaller than the first threshold number $N_{T1}$ (output NO from block 240), the number of valid control steps $N_{VC}$ is decremented (block 250). In the embodiment described herein, the decrement is equal to two. If the result of the decrement operation is negative, the number of valid control steps $N_{VC}$ is set to zero (in practice, the updated value of the number of valid control steps $N_{VC}$ is equal to the smaller between zero and the previous value of the number of valid control steps $N_{VC}$, decreased by two). Then, the control unit 5 reads a new sample of the acceleration signal $A_Z$ (block 200).

If the first validation test of block 230 is passed, the number of valid control steps $N_{VC}$ is incremented by one (block 255), and then the control unit 5 executes a first test on regularity of the sequence of steps recognized (block 260). The first regularity test is based upon a first condition of regularity and envisages comparing the number of valid control steps $N_{VC}$ with a second programmable threshold number $N_{T2}$ greater than the first threshold number $N_{T1}$ (for example, 8). In practice, the first condition of regularity is satisfied when there is a significant prevalence of steps spaced in a substantially uniform way, at the most interrupted sporadically by a number of irregular steps smaller than the first threshold number $N_{T1}$. If the number of valid control steps $N_{VC}$ is smaller than the second threshold number $N_{T2}$ (output NO from block 260), the first condition of regularity is not satisfied, and the first regularity test indicates that there has not yet been identified a sequence of steps corresponding to a sufficiently regular gait, and hence the control unit 5 acquires once again a new sample of the acceleration signal $A_Z$ (block 200), without the total number of valid steps $N_{VT}$ being incremented. Otherwise (output YES from block 260), a sequence of steps is recognized that satisfies the first condition of regularity, and the first regularity test is passed. The number of invalid steps $N_{INV}$ and the number of valid control steps $N_{VC}$ are set to zero, whereas the total number of valid steps $N_{VT}$ is updated and incremented by a value equal to the second threshold number $N_{T2}$ (block 265). Furthermore, the state flag $F_{ST}$ is set at the count value, and the first counting procedure is terminated. In this case, after the test on the state flag of block 120 of FIG. 3, the second counting procedure is executed (block 130).

In practice, the first counting procedure enables the pedometer 1 to remain waiting for a sequence of events corresponding to a sequence of steps that satisfies the first condition of regularity. The regularity of the gait is considered sufficient when the number of valid control steps $N_{VC}$ reaches the second threshold number $N_{T2}$. The events considered irregular or a waiting time that is too long between two successive steps cause the decrement (block 250) or the zeroing (blocks 220 and 245) of the number of valid control steps $N_{VC}$, so that the first counting procedure resumes from the start. As long as the pedometer 1 is in the waiting condition, the total number of valid steps $N_{VT}$ is not incremented because the user is still considered as at rest. However, when the first regularity test (block 260) is passed, the total number of valid steps $N_{VT}$ is immediately updated so as to take into account the valid steps (equal to $N_{T2}$) that make up the sequence considered as being regular. Isolated events and sequence of steps that are in any case too short are thus advantageously ignored, whereas counting of the steps promptly resumes also in the case of isolated irregularities (for example, due to a non-homogeneous acceleration or to a loss of balance at the start of locomotion).

The possibility of programming the value of the first threshold number $N_{T1}$ and of the second threshold number $N_{T2}$ enables modification of the sensitivity of the pedometer in recognizing an initial sequence of steps. For example, the user can program lower values of the first threshold number $N_{T1}$ and of the second threshold number $N_{T2}$ (for example 2 and 4, respectively) when he remains for a long time in a closed environment, for example an office or a room, where it would not in any case be possible to maintain a regular gait for a long time. In this way, shorter sequences of steps are validated and counted. Instead, during a more constant and intense activity, such as running, the gait remains constant for a long time, and hence the first threshold number $N_{T1}$ and the second threshold number $N_{T2}$ can be programmed with higher values (for example, 4 and 12, respectively). Step sequences that are shorter and not very significant in relation to the activity performed can be ignored.

Figure 3:
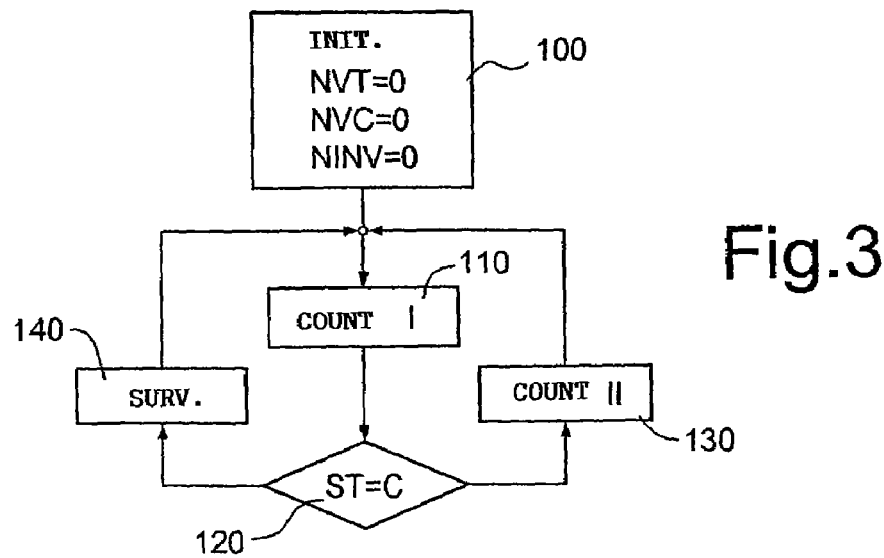
FIG. 3 shows a flowchart corresponding to a control method according to the present invention executed by the pedometer of FIGS. 1 and 2.
Figure 7:
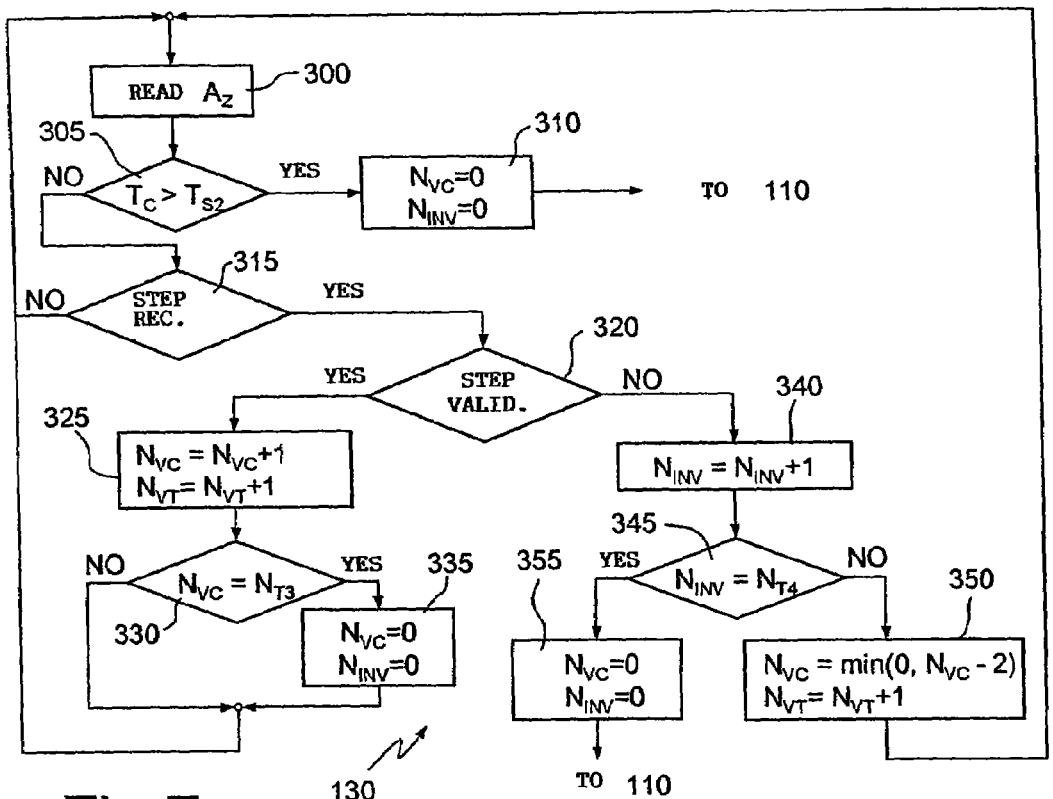
FIG. 7 is a more detailed flowchart corresponding to a second step of the method of FIG. 3.
Figure 5:
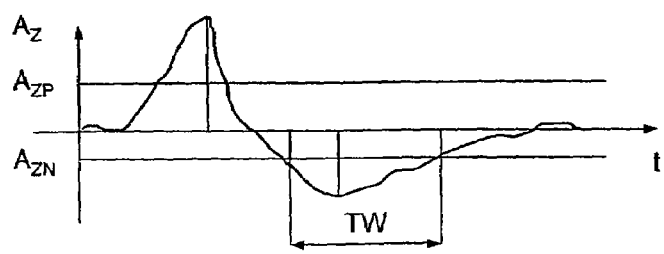
FIG. 5 is a graph that represents first quantities used in the method according to the present invention.

FIG. 7 illustrates in detail the second counting procedure (executed in block 130 of FIG. 3).

The control unit 5 initially reads a sample of the acceleration signal $A_Z$ (block 300), and then evaluates whether the time interval $T_C$ that has elapsed from the last step recognized is higher than the first second time threshold $T_{S2}$ (block 305). If so (output YES from block 205), the number of invalid steps $N_{INV}$ and the number of valid control steps $N_{VC}$ are zeroized (block 310), and the second counting procedure is terminated. Otherwise (output NO from block 305), a step-recognition test is carried out (block 315), identical to the step-recognition test of block 225 of FIG. 3. Also in this case, then, step recognition is based upon the detection of a positive peak of the acceleration signal $A_Z$ followed by a negative peak that falls in the time window TW (see FIG. 5).

If the control unit 5 does not recognize an event corresponding to a step (output NO from block 315), a new sample of the acceleration signal $A_Z$ is read (block 300). If, instead, the step-recognition test is passed (output YES from block 315), a second validation test is made, corresponding to the regularity of the individual step (block 320). The second validation test is altogether similar to the first validation test carried out in block 230 of FIG. 3. Also in this case, then, the last step recognized is validated if the instant of recognition of the current step $T_C(K)$ falls within the validation interval TV defined above. In practice, it is verified that the last step recognized is compatible with the frequency of the last steps made previously.

If the check yields a positive result (output YES from block 320), the control unit 5 updates the total number of valid steps $N_{VT}$ and the number of valid control steps $N_{VC}$, incrementing them by one (block 325). The number of valid control steps $N_{VC}$ is then compared with a third programmable threshold number $N_{T3}$ (block 330), which, in the embodiment described herein, is equal to the second threshold number $N_{T2}$. If the number of valid control steps $N_{VC}$ is smaller than the second threshold number $N_{T2}$ (output NO from block 330), the control unit 5 once again directly acquires a new sample of the acceleration signal $A_Z$ (block 300), whereas otherwise (output YES from block 330), the number of invalid steps $N_{INV}$ and the number of valid control steps $N_{VC}$ are set to zero (block 335) prior to acquisition of a new sample $A_Z$.

If, instead, the second validation test of block 320 is negative, the number of invalid steps $N_{INV}$ is incremented by one (block 340) before being compared with a fourth programmable threshold number $N_{T4}$ (block 345), which, in the present embodiment, is equal to the first threshold number $N_{T1}$. If the number of invalid steps $N_{INV}$ is smaller than the fourth threshold number $N_{T4}$ (output NO from block 345), the number of valid control steps $N_{VC}$ is decremented (block 350), here by two. Also in this case, if the result of the decrement operation is negative, the number of valid control steps $N_{VC}$ is set to zero (the updated value of the number of valid control steps $N_{VC}$ is equal to the smaller between zero and the previous value of the number of valid control steps $N_{VC}$, decreased by two). Then, the control unit 5 reads a new sample of the acceleration signal $A_Z$ (block 300). If the number of invalid steps $N_{INV}$ has reached the fourth threshold number $N_{T4}$ (output YES from block 345), the number of invalid steps $N_{INV}$ and the number of valid control steps $N_{VC}$ are set to zero (block 355), and the second counting procedure is terminated.

In practice, the second counting procedure is based on a second condition of regularity, which is satisfied as long as sporadic irregular steps occur within sequences of steps spaced in a substantially homogeneous way. More precisely, the second condition of regularity is satisfied as long as the number of invalid steps $N_{INV}$ is smaller than the fourth threshold number $N_{T4}$. Consequently, the second counting procedure continues to update and increment the total number of valid steps $N_{VT}$ as long as the gait of the user is kept regular. Possible isolated irregularities are ignored and do not interrupt or suspend updating of the count, which is, instead, interrupted when prolonged pauses occur or in the presence of significant discontinuities in locomotion. However, if the gait becomes regular again, even with a different rhythm, also the count promptly resumes, because the first counting procedure is once again executed. This prevents a significant number of steps from being neglected.

Figure 8:
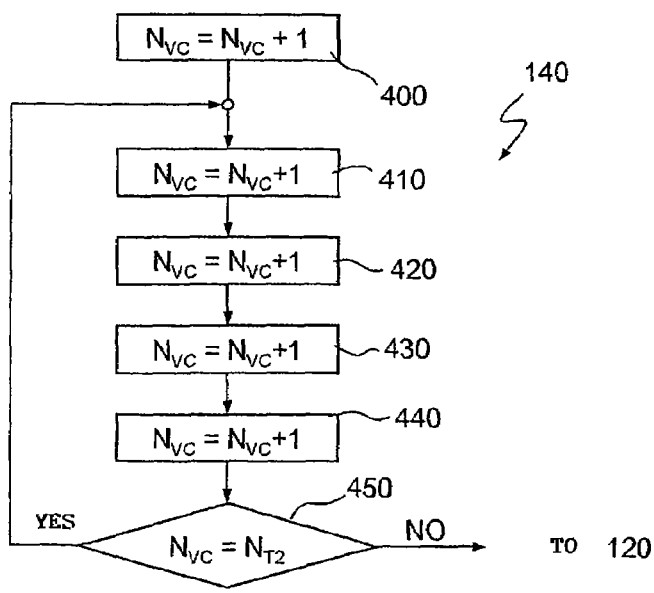
FIG. 8 is a more detailed flowchart corresponding to a third step of the method of FIG. 3.

The surveying procedure executed in block 140 of FIG. 3 will now be described in greater detail, with reference to FIG. 8.

When the surveying procedure is started, a current mean value $A_{ZM}$ of the acceleration signal $A_Z$ is stored in the non-volatile-memory module (not illustrated) of the control unit 5 (block 400). The current mean value $A_{ZM}$ represents an estimate of the DC component of the acceleration signal $A_Z$, which, when the cell phone 2 containing the pedometer 1 is stationary, is determined substantially by the contribution of the acceleration of gravity along the detection axis Z. In practice, then, the current mean value $A_{ZM}$ provides an estimate of the position of the cell phone 2 and of the pedometer 1.

After storage of the current mean value $A_{ZM}$, the pedometer 1 is set in a low-consumption operating condition (power-down condition), in which at least the inertial sensor 3 is inactive (block 410).

A waiting cycle is then carried out (block 420), for example of the duration of 10 s, after which all the functions of the pedometer 1 are re-activated ("power on", block 430).

The control unit 5 acquires from the inertial sensor 3 a number of samples of the acceleration signal $A_Z$ sufficient for estimating an updated mean value $A_{ZM}'$ (block 440), which is then compared with the current mean value $A_{ZM}$ previously stored (block 450).

If the updated mean value $A_{ZM}'$ departs from the current mean value $A_{ZM}$ (output NO from block 450), the surveying procedure is interrupted, and the first counting procedure indicated in block 110 of FIG. 3 is executed. If, instead, the updated mean value $A_{ZM}'$ is substantially unvaried with respect to the current mean value $A_{ZM}$ (output YES from block 450), the surveying procedure proceeds and the pedometer 1 is set again in the low-consumption operating condition (block 410).

Clearly, the use of the surveying procedure enables a drastic reduction in the power consumption when the pedometer 1 is not used and, hence increases the autonomy thereof. If, as in the embodiment described, the pedometer 1 is integrated in a portable device with which it shares the use of resources, for example the control unit 5, the surveying procedure entails further advantages. In fact, the de-activation of the functions linked to the pedometer 1 frees the shared resources for use by the active functions, which can thus access the resources themselves in a more efficient way.

Finally, it is evident that modifications and variations can be made to the device described herein, without thereby departing from the scope of the present invention, as defined in the annexed claims.

In particular, the control procedure described can be used to advantage in a stand-alone pedometer or in any case one integrated in a further portable device, but with stand-alone and non-shared resources.

Furthermore, the conditions of regularity used to enable or prevent counting of the steps recognized can be different from the ones described. For example, a sequence of steps can be considered regular when possible steps recognized and not validated are separated by at least one pre-determined number of consecutive validated steps. Again, a sequence of a pre-determined number of validated or non-validated steps (sequence of fixed length) can be considered regular when the validated steps are at least a given percentage of the steps of the sequence.

Finally, the inertial sensor can be of the type with two or three axes of detection. In this case, step recognition can advantageously be performed by selecting the acceleration signal corresponding to the detection axis nearest to the vertical. The nearer the detection axis used is to the vertical, in fact, the greater the amplitude of the signal useful for step recognition. The detection axis is selected on the basis of the value of the DC component of the respective acceleration signal, which is correlated to the contribution of the acceleration of gravity. The detection axis nearest to the vertical is the axis along which the contribution of the acceleration of gravity is greater. The pedometer can then be used independently of how it is oriented.

The invention claimed is:

1. A method for controlling a pedometer, the method comprising:
    generating a signal correlated to movements of a user of the pedometer;
    detecting steps of the user based on said signal;
    checking whether sequences of the detected steps indicate whether the sequences of the detected steps correspond to a regular gait of the user;
    updating a total number of valid steps if said sequences correspond to the regular gait of the user;
    preventing updating of said total number of valid steps if said sequences do not correspond to the regular gait of the user; and
    partially deactivating the pedometer if said detecting steps of the user based on said signal fails for a period longer than a time threshold.

2. The method according to claim 1, wherein said checking comprises:
    in a first operating condition, checking whether a first condition of regularity is satisfied; and
    in a second operating condition, checking whether a second condition of regularity is satisfied.

3. The method according to claim 2, wherein, during said checking whether said first condition of regularity is satisfied, the updating of said total number of valid steps is prevented.

4. The method according to claim 2, wherein, during said checking whether said second condition of regularity is satisfied, the updating of said total number of valid steps is allowed.

5. A method for controlling a pedometer, the method comprising:
    generating a signal correlated to movements of a user of the pedometer;

detecting steps of the user based on said signal;
checking whether sequences of the detected steps indicate whether the sequences of the detected steps correspond to a regular gait of the user;
updating a total number of valid steps if said sequences correspond to the regular gait of the user; and
preventing updating of said total number of valid steps if said sequences do not correspond to the regular gait of the user,
wherein checking whether sequences of the detected steps indicate whether the sequences of the detected steps correspond to a regular gait of the user includes:
executing a first validation test of a current detected step;
incrementing a number of valid control steps if based on said first validation test said current detected step is validated; and
incrementing a number of invalid steps and decrementing said number of valid control steps if based on said first validation test said current detected step is not validated.

6. The method according to claim 5, wherein said executing said first validation test of said current detected step comprises evaluating whether a duration of said current detected step is homogeneous with respect to a duration of an immediately preceding detected step.

7. The method according to claim 6, wherein said first validation test yields a positive result when an instant of recognition of the current detected step $T_R(K)$ falls within a validation interval, defined with respect to an instant of recognition of the immediately preceding detected step $T_R(K-1)$, in the following way:

$$TV=[T_R(K-1)+\Delta T_{K-1}-TA, T_R(K-1)+\Delta T_{K-1}+TB]$$

where $\Delta T_{K-1}$ is said duration of the immediately preceding detected step, and TA and TB are complementary portions of said validation interval.

8. The method according to claim 5, further comprising checking whether a first condition of regularity is satisfied, wherein said checking whether said first condition of regularity is satisfied comprises comparing said number of invalid steps with a first threshold number and comparing said number of valid control steps with a second threshold number.

9. The method according to claim 8, wherein said first condition of regularity is satisfied if said number of valid control steps is equal to said second threshold number.

10. The method according to claim 8, further comprising checking whether a second condition of regularity is satisfied by:
executing a second validation test of said current detected step;
incrementing said number of valid control steps and said total number of valid steps if based on said second validation test said current detected step is validated; and
incrementing a number of invalid steps if based on said second validation test said current detected step is not validated.

11. The method according to claim 10, wherein said checking whether said second condition of regularity is satisfied comprises comparing said number of valid control steps with a third threshold number and comparing said number of invalid steps with a fourth threshold number.

12. The method according to claim 11, wherein said second condition of regularity is satisfied if said number of invalid steps is smaller than said fourth threshold number.

13. The method according to claim 12, further comprising incrementing said total number of valid steps and decrementing said number of valid control steps if, based on said second validation test, said current detected step is not validated and said number of invalid steps is smaller than said fourth threshold number.

14. A pedometer, comprising:
an inertial sensor structured to generate a signal correlated to movements of a user of the pedometer; and
a control unit coupled to said inertial sensor, said control unit including:
detecting means for detecting steps of the user based on said signal;
checking means for checking whether sequences of the detected steps indicate whether the sequences of the detected steps correspond to a regular gait of the user;
updating means for updating a total number of valid steps if said sequences correspond to the regular gait of the user; and
preventing means for preventing updating of said total number of valid steps if said sequences do not correspond to the regular gait of the user.

15. A pedometer, comprising:
an inertial sensor structured to generate a signal correlated to movements of a user of the pedometer; and
a control unit coupled to said inertial sensor, said control unit including:
detecting means for detecting steps of the user based on said signal;
checking means for checking whether sequences of the detected steps indicate whether the sequences of the detected steps correspond to a regular gait of the user;
updating means for updating a total number of valid steps if said sequences correspond to the regular gait of the user; and
preventing means for preventing updating of said total number of valid steps if said sequences do not correspond to the regular gait of the user,
wherein said checking means includes:
means for executing a first validation test of a current detected step by evaluating whether a duration of said current detected step is homogeneous with respect to a duration of an immediately preceding detected step;
first incrementing means for incrementing a number of valid control steps if based on said first validation test said current detected step is validated; and
second incrementing means for incrementing a number of invalid steps if based on said first validation test said current detected step is not validated.

16. The pedometer according to claim 15, wherein said first validation test yields a positive result when an instant of recognition of the current detected step $T_R(K)$ falls within a validation interval, defined with respect to an instant of recognition of the immediately preceding detected step $T_R(K-1)$, in the following way:

$$TV=[T_R(K-1)+\Delta T_{K-1}-TA, T_R(K-1)+\Delta T_{K-1}+TB]$$

where $\Delta T_{K-1}$ is said duration of the immediately preceding detected step, and TA and TB are complementary portions of said validation interval.

17. A pedometer, comprising:
an inertial sensor structured to generate a signal correlated to movements of a user of the pedometer; and
a control unit coupled to said inertial sensor, said control unit including:
detecting means for detecting steps of the user based on said signal;
checking means for checking whether sequences of the detected steps indicate whether the sequences of the detected steps correspond to a regular gait of the user;

updating means for updating a total number of valid steps if said sequences correspond to the regular gait of the user; and
preventing means for preventing updating of said total number of valid steps if said sequences do not correspond to the regular gait of the user,
wherein said checking means include means for executing a first validation test of a current detected step by comparing a first number of invalid steps with a first threshold number and comparing a number of valid control steps with a second threshold number.

18. The pedometer according to claim 17, wherein the sequences of detected steps correspond to the regular gait of the user if said number of valid control steps is equal to said second threshold number.

19. The pedometer according to claim 17, wherein said checking means checks whether sequences of the detected steps indicate whether the sequences of the detected steps correspond to a regular gait of the user by:
executing a second validation test of said current detected step;
incrementing said number of valid control steps and said total number of valid steps if based on said second validation test said current detected step is validated; and
incrementing a second number of invalid steps if based on said second validation test said current detected step is not validated.

20. A portable electronic device, comprising:
a user interface that enables communication with a user;
an inertial sensor structured to generate a signal correlated to movements of the user; and
a control unit coupled to said inertial sensor, said control unit including:
detecting means for detecting steps of the user based on said signal;
checking means for checking whether sequences of the detected steps indicate whether the sequences of the detected steps correspond to a regular gait of the user;
updating means for updating a total number of valid steps if said sequences correspond to the regular gait of the user; and
preventing means for preventing updating of said total number of valid steps if said sequences do not correspond to the regular gait of the user.

21. The portable electronic device according to claim 20 wherein the device is a mobile phone.

22. A portable electronic device, comprising:
a user interface that enables communication with a user;
an inertial sensor structured to generate a signal correlated to movements of the user; and
a control unit coupled to said inertial sensor, said control unit including:
detecting means for detecting steps of the user based on said signal;
checking means for checking whether sequences of the detected steps indicate whether the sequences of the detected steps correspond to a regular gait of the user;
updating means for updating a total number of valid steps if said sequences correspond to the regular gait of the user; and
preventing means for preventing updating of said total number of valid steps if said sequences do not correspond to the regular gait of the user,
wherein said checking means includes:
means for executing a first validation test of a current detected step by evaluating whether a duration of said current detected step is homogeneous with respect to a duration of an immediately preceding detected step;
first incrementing means for incrementing a number of valid control steps if based on said first validation test said current detected step is validated; and
second incrementing means for incrementing a number of invalid steps if based on said first validation test said current detected step is not validated.

23. The portable electronic device according to claim 22, wherein said first validation test yields a positive result when an instant of recognition of the current detected step $T_R(K)$ falls within a validation interval, defined with respect to an instant of recognition of the immediately preceding detected step $T_R(K-1)$, in the following way:

$$TV=[T_R(K-1)+\Delta T_{K-1}-TA,\ T_R(K-1)+\Delta T_{K-1}+TB]$$

where $\Delta T_{K-1}$ is said duration of the immediately preceding detected step, and TA and TB are complementary portions of said validation interval.

24. A portable electronic device, comprising:
a user interface that enables communication with a user;
an inertial sensor structured to generate a signal correlated to movements of the user; and
a control unit coupled to said inertial sensor, said control unit including:
detecting means for detecting steps of the user based on said signal;
checking means for checking whether sequences of the detected steps indicate whether the sequences of the detected steps correspond to a regular gait of the user;
updating means for updating a total number of valid steps if said sequences correspond to the regular gait of the user; and
preventing means for preventing updating of said total number of valid steps if said sequences do not correspond to the regular gait of the user,
wherein said checking means include means for executing a first validation test of a current detected step by comparing a first number of invalid steps with a first threshold number and comparing a number of valid control steps with a second threshold number.

25. The portable electronic device according to claim 24, wherein the sequences of detected steps correspond to the regular gait of the user if said number of valid control steps is equal to said second threshold number.

26. The portable electronic device according to claim 24, wherein said checking means checks whether sequences of the detected steps indicate whether the sequences of the detected steps correspond to a regular gait of the user by:
executing a second validation test of said current detected step;
incrementing said number of valid control steps and said total number of valid steps if based on said second validation test said current detected step is validated; and
incrementing a second number of invalid steps if based on said second validation test said current detected step is not validated.

* * * * *